(12) United States Patent
Wang

(10) Patent No.: US 12,137,223 B2
(45) Date of Patent: Nov. 5, 2024

(54) VIDEO DECODING METHOD, VIDEO CODING METHOD, AND RELATED APPARATUS

(71) Applicant: TENCENT TECHNOLOGY (SHENZHEN) COMPANY LIMITED, Shenzhen (CN)

(72) Inventor: Liqiang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 70 days.

(21) Appl. No.: 17/970,066

(22) Filed: Oct. 20, 2022

(65) Prior Publication Data

US 2023/0053118 A1 Feb. 16, 2023

Related U.S. Application Data

(63) Continuation of application No. PCT/CN2021/130206, filed on Nov. 12, 2021.

(30) Foreign Application Priority Data

Nov. 17, 2020 (CN) .................. 202011286559.7

(51) Int. Cl.
*H04N 19/124* (2014.01)
*H04N 19/176* (2014.01)
(Continued)

(52) U.S. Cl.
CPC ......... *H04N 19/124* (2014.11); *H04N 19/176* (2014.11); *H04N 19/18* (2014.11); *H04N 19/44* (2014.11); *H04N 19/91* (2014.11)

(58) Field of Classification Search
CPC .. H04N 19/176; H04N 19/174; H04N 19/172; H04N 1/41; H04N 19/517;
(Continued)

(56) References Cited

U.S. PATENT DOCUMENTS 7,330,509 B2 2/2008 Lu et al.
7,983,496 B2 7/2011 Liu et al.
(Continued)

FOREIGN PATENT DOCUMENTS

CN 104471935 A 3/2015
CN 105165012 A 12/2015
(Continued)

OTHER PUBLICATIONS

The World Intellectual Property Organization (WIPO) International Search Report for PCT/CN2021/130206 Jan. 27, 2022 7 Pages (including translation).
(Continued)

*Primary Examiner* — Nathnael Aynalem
(74) *Attorney, Agent, or Firm* — ANOVA LAW GROUP, PLLC

(57) ABSTRACT

A video decoding method includes: performing entropy decoding on a coding block of a video image frame to obtain a quantization coefficient block of residual data corresponding to the coding block; inversely quantizing the quantization coefficient block to obtain an inverse quantization coefficient matrix; inversely rearranging the inverse quantization coefficient matrix to obtain a processed coefficient matrix, non-zero coefficients in the processed coefficient matrix being concentrated in left, upper and upper left regions of the coefficient matrix; and generating the residual data according to the processed coefficient matrix.

19 Claims, 14 Drawing Sheets

(51) Int. Cl.
  *H04N 19/18*   (2014.01)
  *H04N 19/44*   (2014.01)
  *H04N 19/91*   (2014.01)

(58) Field of Classification Search
  CPC .... H04N 19/94; H04N 5/9264; H04N 5/9262; H04N 19/503; H04N 19/18; H04N 19/645; H04N 19/124
  USPC ............................................ 375/240–240.29
  See application file for complete search history.

(56) References Cited

U.S. PATENT DOCUMENTS

| | | | |
|---|---|---|---|
| 8,085,852 B2 | 12/2011 | Liu et al. | |
| 8,238,442 B2 | 8/2012 | Liu | |
| 8,526,495 B2 | 9/2013 | Liu et al. | |
| 9,049,452 B2 | 6/2015 | Liu et al. | |
| 9,363,511 B2 | 6/2016 | Zhang et al. | |
| 9,769,472 B2 | 9/2017 | Liu et al. | |
| 10,136,144 B2 | 11/2018 | Liu et al. | |
| 10,205,968 B2 | 2/2019 | Liu et al. | |
| 10,257,521 B2 | 4/2019 | Lee et al. | |
| 10,397,569 B2 | 8/2019 | Liu et al. | |
| 10,455,231 B2 | 10/2019 | Xu et al. | |
| 10,511,834 B2 | 12/2019 | Xu et al. | |
| 10,542,253 B2 | 1/2020 | Liu et al. | |
| 10,567,752 B2 | 2/2020 | Zhao et al. | |
| 10,575,013 B2 | 2/2020 | Liu et al. | |
| 10,582,195 B2 | 3/2020 | Liu et al. | |
| 10,587,881 B2 | 3/2020 | Xu et al. | |
| 10,587,885 B2 | 3/2020 | Ye et al. | |
| 10,595,019 B2 | 3/2020 | Chernyak et al. | |
| 10,609,384 B2 | 3/2020 | Chen et al. | |
| 10,609,402 B2 | 3/2020 | Zhao et al. | |
| 10,609,403 B2 | 3/2020 | Xu et al. | |
| 10,666,968 B2 | 5/2020 | Xu et al. | |
| 2013/0058407 A1 | 3/2013 | Sole Rojals et al. | |
| 2013/0128966 A1 | 5/2013 | Gao et al. | |
| 2014/0016698 A1 | 1/2014 | Joshi et al. | |
| 2015/0078432 A1* | 3/2015 | Wang .................... | H04N 19/176 375/240.16 |
| 2017/0280163 A1* | 9/2017 | Kao ....................... | H04N 19/593 |
| 2017/0353738 A1* | 12/2017 | Chiu ..................... | H04N 19/436 |
| 2019/0215516 A1 | 7/2019 | Lim et al. | |
| 2021/0168401 A1 | 6/2021 | Park et al. | |
| 2022/0094930 A1* | 3/2022 | Zhang .................. | H04N 19/132 |
| 2022/0248017 A1* | 8/2022 | Lim ...................... | H04N 19/176 |

FOREIGN PATENT DOCUMENTS

| | | |
|---|---|---|
| WO | 2014176362 A1 | 10/2014 |
| WO | 2018194189 A1 | 10/2018 |

OTHER PUBLICATIONS

Rajithia W et al, "Mirroring of Coefficients for Transform Skipping", Jun. 29, 2012, Joint Collaborative Team on Video Coding (JCT-VC) of ITU-T SG 16 WP 3 and ISO/IEC JTC 1/SC 29/WG 11.

Shan Liu et al. "Hybrid global-local motion compensated frame interpolation for low bit rate video coding", p. 58-76, Journal of Visual Communication and Image Representation.
Benjamin Bross et al. "Versatile Video Coding (Draft 2)", Jul. 10-18, 2018, ISO/IEC JTC1/SC29/WG11 JVET-K1001.
Benjamin Bross et al. "General Video Coding Technology in Responses to the Joint Call for Proposals on Video Compression with Capability beyond HEVC", 2019, vol. 30, No. 5, IEEE Transactions on Circuits and Systems for Video Technology.
Dong Liu et al. "Deep Learning-Based Technology in Responses to the Joint Call for Proposals on Video Compression with Capability beyond HEVC" 2019, IEEE Transactions on Circuits and Systems for Video Technology.
Han Zhu et al. "Residual convolutional neural network based in-loop filter with intra and inter frames processed respectively for AVS3" Jul. 2020, 2020 IEEE International Conference on Multimedia & Expo Workshops (ICMEW), London, UK.
Shan Liu et al. "Joint Temporal-Spatial Bit Allocation for Video Coding With Dependency", Jan. 2005, vol. 15 No. 1, IEEE Transactions on Circuits and Systems for Video Technology.
Rajan Joshi et al. "High Efficiency Video Coding (HEVC) Screen Content Coding: Draft 4", Jun. 19-26, 2015, ISO/IEC JTC1/SC29/WG11 JCTVC-U1005. Part 1.
Rajan Joshi et al. "High Efficiency Video Coding (HEVC) Screen Content Coding: Draft 4", Jun. 19-26, 2015, ISO/IEC JTC1/SC29/WG11 JCTVC-U1005. Part 2.
Rajan Joshi et al. "High Efficiency Video Coding (HEVC) Screen Content Coding: Draft 4", Jun. 19-26, 2015, ISO/IEC JTC1/SC29/WG11 JCTVC-U1005. Part 3.
Shan Liu et al. "Overview of HEVC extensions on screen content coding", vol. 4. 2015, Cambridge University Press.
Rajan Joshi et al. "Screen content coding test model 1 (SCM 1)", JCTVC-Q1014, Valencia, Spain.
Xiaozhong Xu et al. "Block vector prediction for intra block copying in HEVC screen content coding", p. 273-282, 2015 Data Compression Conference.
Xiaozhong Xu et al. "Intra block copy in Versatile Video Coding with Reference Sample Memory Reuse" ,2019 Picture Coding Symposium (PCS).
Chun-Chi Chen et al. "Screen Content Coding Using Non-Square Intra Block Copy for HEVC", Jul. 2014, 2014 IEEE International Conference on Multimedia and Expo (ICME), Chengdu, China.
Yingbin Wang et al. "Intra Block Copy in AVS3 Video Coding Standard", Jul. 2020, 2020 IEEE International Conference on Multimedia & Expo Workshops (ICMEW), London, UK.
Shan Liu et al. "Nonlinear motion-compensated interpolation for low-bit-rate video", p. 205-213, Applications of Digital Image Processing XXIII 4115.
Ximin Zhang et al. "Intra mode coding in HEVC standard", p. 1-6, 2012 Visual Communications and Image Processing.
Shan Liu et al. "Bit-depth scalable coding for high dynamic range video", 2008, vol. 6822. Journal of Visual Communication and Image Representation.
Xiaozhong Xu et al. "Intra Block Copy in HEVC Screen Content Coding Extensions", vol. 6, Issue 4, p. 409-419, IEEE Journal on Emerging and Selected Topics in Circuits and Systems.
The European Patent Office (EPO) The Extended European Search Report for 21893825.6. Feb. 20, 2024 7 Pages.

* cited by examiner

VIDEO DECODING METHOD, VIDEO CODING METHOD, AND RELATED APPARATUS

RELATED APPLICATION(S)

This application is a continuation application of PCT Patent Application No. PCT/CN2021/130206 filed on Nov. 12, 2021, which claims priority to Chinese Patent Application No. 202011286559.7, entitled "VIDEO DECODING METHOD, APPARATUS, AND ELECTRONIC DEVICE" and filed with the National Intellectual Property Administration, PRC on Nov. 17, 2020, all of which are incorporated herein by reference in entirety.

FIELD OF THE TECHNOLOGY

The present disclosure relates to the technical field of computers and communications, and in particular, to video coding and decoding.

BACKGROUND

In a video coding process, a coding end usually performs transform, quantization and entropy coding processing on residual data between original video data and prediction video data and transmits the residual data to a decoding end. There is also a weak correlation of partial residuals, which may skip the transform process.

A coefficient coding module is more efficient for coding a coefficient matrix in which non-zero coefficients are concentrated in an upper left corner, but coefficients after transform or skipping transform do not meet the desirables of the coefficient coding module.

The residuals of transform skipping are taken as an example. A current transform skipping method in an audio video coding standard (AVS) 3 skips the transform process of residuals directly. However, due to the characteristics of intra-frame prediction, residual energy in a lower right corner of a residual block is higher. It is difficult to reduce the size of a scan region coefficient coding (SRCC) region by directly performing coefficient coding, thereby reducing the efficiency of SRCC and thus also affecting the video coding efficiency.

SUMMARY

Embodiments of the present disclosure provide a video decoding method, a video coding method, and related apparatuses, thereby effectively improving the video coding efficiency at least to some extent.

In one aspect, the present disclosure provides a video decoding method is provided. The method is performed by a computing device. The method includes: performing entropy decoding on a coding block of a video image frame to obtain a quantization coefficient block of residual data corresponding to the coding block; inversely quantizing the quantization coefficient block to obtain an inverse quantization coefficient matrix; inversely rearranging the inverse quantization coefficient matrix to obtain a processed coefficient matrix, non-zero coefficients in the processed coefficient matrix being concentrated in left, upper and upper left regions of the coefficient matrix; and generating the residual data according to the processed coefficient matrix.

In another aspect, the present disclosure provides a video coding method. The method is performed by a computing device. The method includes: performing a difference operation on an original image signal and a prediction image signal corresponding to a coding block to obtain residual data corresponding to the coding block; obtaining a quantization coefficient matrix corresponding to the residual data according to the residual data; rearranging the quantization coefficient matrix to obtain a processed coefficient matrix, non-zero coefficients in the processed coefficient matrix being concentrated in left, upper and upper left regions of the coefficient matrix; quantizing the processed coefficient matrix to obtain a quantization coefficient block of the residual data corresponding to the coding block; and performing entropy coding on quantization coefficients in the quantization coefficient block to obtain a coded video code stream.

In yet another aspect, the present disclosure provides a video decoding apparatus. The apparatus is deployed on a computing device. The apparatus includes: a memory storing computer program instructions; and a processor coupled to the memory and configured to execute the computer program instructions and perform: performing entropy decoding on a coding block of a video image frame to obtain a quantization coefficient block of residual data corresponding to the coding block; inversely quantizing the quantization coefficient block to obtain an inverse quantization coefficient matrix; inversely rearranging the inverse quantization coefficient matrix to obtain a processed coefficient matrix, non-zero coefficients in the processed coefficient matrix being concentrated in left, upper and upper left regions of the coefficient matrix; and generating the residual data according to the processed coefficient matrix In yet another aspect, the present disclosure provides a video coding apparatus. The apparatus is deployed on a computing device. The apparatus includes: a memory storing computer program instructions; and a processor coupled to the memory and configured to execute the computer program instructions and perform: performing a difference operation on an original image signal and a prediction image signal corresponding to a coding block to obtain residual data corresponding to the coding block; obtaining a quantization coefficient matrix corresponding to the residual data according to the residual data; rearranging the quantization coefficient matrix to obtain a processed coefficient matrix, non-zero coefficients in the processed coefficient matrix being concentrated in left, upper and upper left regions of the coefficient matrix; quantizing the processed coefficient matrix to obtain a quantization coefficient block of the residual data corresponding to the coding block; and performing entropy coding on quantization coefficients in the quantization coefficient block to obtain a coded video code stream In yet another aspect, the present disclosure provides a computer-readable medium, storing a computer program, the computer program, when executed by a processor, implementing the video decoding method or the video coding method according to the embodiments.

In yet another aspect, the present disclosure provides an electronic device, including: one or more processors; and a storage apparatus, configured to store one or more programs, the one or more programs, when executed by the one or more processors, causing the one or more processors to implement the video decoding method or the video coding method according to the embodiments.

In yet another aspect, the present disclosure provides a computer program product or a computer program, the computer program product or the computer program including computer instructions, the computer instructions being stored in a computer-readable storage medium. A processor of a computing device reads the computer instructions from the computer-readable storage medium, and the processor executes the computer instructions, to cause the computing device to implement the video decoding method or the video coding method provided in the various optional embodiments described above.

In the technical solutions provided by some embodiments of the present disclosure, an inverse quantization coefficient matrix is inversely rearranged, and residual data is generated according to the processed coefficient matrix, whereby non-zero coefficients in the inverse quantization coefficient matrix can be more concentrated in left, upper and upper left regions of the coefficient matrix by inversely rearranging the inverse quantization coefficient matrix. Thus, the area of an SRCC region can be reduced during coding, thereby effectively improving the video coding efficiency.

The technical solutions of the embodiments of the present disclosure can effectively improve the video coding efficiency.

It is to be understood that the general descriptions and the following detailed descriptions are merely for illustration and explanation purposes and are not intended to limit the present disclosure.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

FIG. 5 shows a schematic diagram of a sequence of scanning a marked scan region;

FIGS. 7A-7C show a schematic diagram of rotating an inverse quantization coefficient matrix according to certain embodiment(s) of the present disclosure;

FIGS. 8A-8D show a schematic diagram of flipping an inverse quantization coefficient matrix according to certain embodiment(s) of the present disclosure;

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

The described features, structures, or characteristics may be combined in one or more embodiments in any appropriate manner. In the following descriptions, more specific details are provided to provide a comprehensive understanding of the embodiments of the present disclosure. However, a person skilled in the art is to be aware that, the technical solutions in the present disclosure may be implemented without one or more of the specific details, or another method, unit, apparatus, or step may be used. In other cases, well-known methods, apparatuses, implementations, or operations are not shown or described in detail, to avoid obscuring aspects of the present disclosure.

The block diagrams shown in the accompany drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case.

"Plurality of" mentioned herein means two or more. And/or describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
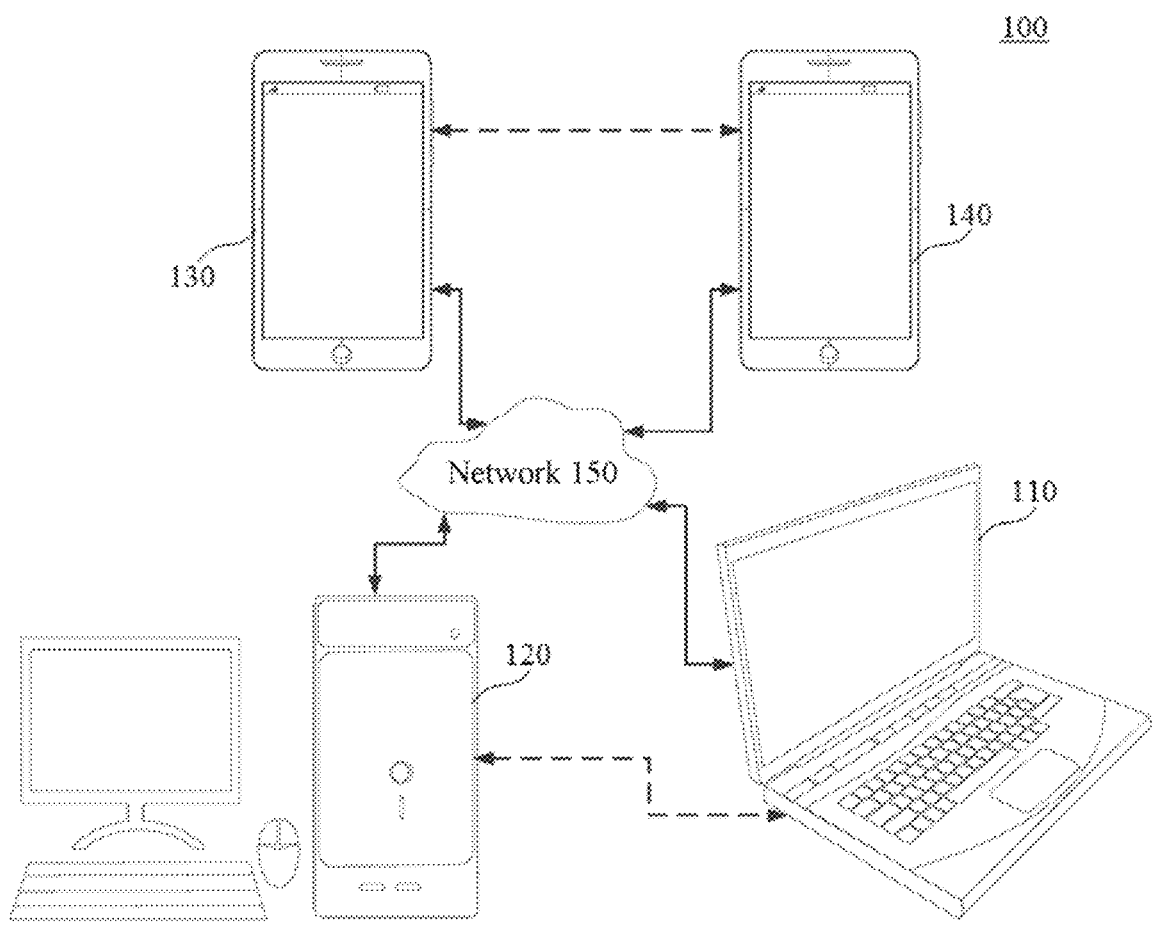
FIG. 1 shows a schematic diagram of an exemplary system architecture according to certain embodiment(s) of the present disclosure.

FIG. 1 is a schematic diagram of an exemplary system architecture to which a technical solution according to an embodiment of the present disclosure is applicable.

As shown in FIG. 1, a system architecture 100 includes a plurality of terminal apparatuses that may communicate with each other via, for example, a network 150. For example, the system architecture 100 may include a first terminal apparatus 110 and a second terminal apparatus 120 interconnected via the network 150. In an embodiment of FIG. 1, the first terminal apparatus 110 and the second terminal apparatus 120 perform unidirectional data transmission.

For example, the first terminal apparatus 110 may code video data (for example, a video picture stream collected by the first terminal apparatus 110) for transmission over the network 150 to the second terminal apparatus 120. The coded video data is transmitted in one or more coded video code streams. The second terminal apparatus 120 may receive the coded video data from the network 150, decode the coded video data to restore the video data, and display a video picture according to the restored video data.

In an embodiment of the present disclosure, the system architecture 100 may include a third terminal apparatus 130 and a fourth terminal apparatus 140 that perform bi-directional transmission of the coded video data. The bi-directional transmission may occur, for example, during a video conference. For bi-directional data transmission, each terminal apparatus of the third terminal apparatus 130 and the fourth terminal apparatus 140 may code video data (for example, a video picture stream collected by the terminal apparatus) for transmission over the network 150 to the other terminal apparatus of the third terminal apparatus 130 and the fourth terminal apparatus 140. Each terminal apparatus of the third terminal apparatus 130 and the fourth terminal apparatus 140 may also receive the coded video data transmitted by the other terminal apparatus of the third terminal apparatus 130 and the fourth terminal apparatus 140, may decode the coded video data to restore the video data, and may display a video picture on an accessible display apparatus according to the restored video data.

In the embodiment of FIG. 1, the first terminal apparatus 110, the second terminal apparatus 120, the third terminal apparatus 130, and the fourth terminal apparatus 140 may be a server, a personal computer and a smart phone, but the principles disclosed in the present disclosure may not be limited thereto. Embodiments disclosed in the present disclosure are applicable to laptop computers, tablet computers, media players, and/or dedicated video conferencing devices. The network 150 represents any number of networks that communicate the coded video data between the first terminal apparatus 110, the second terminal apparatus 120, the third terminal apparatus 130, and the fourth terminal apparatus 140, including, for example, wired and/or wireless communication networks. The communication network 150 may exchange data in circuit-switched and/or packet-switched channels. The network may include a telecommunications network, a local area network, a wide area network, and/or the Internet. For purposes of the present disclosure, unless explained below, the architecture and topology of the network 150 may be insignificant to the operation disclosed in the present disclosure.

Figure 2:
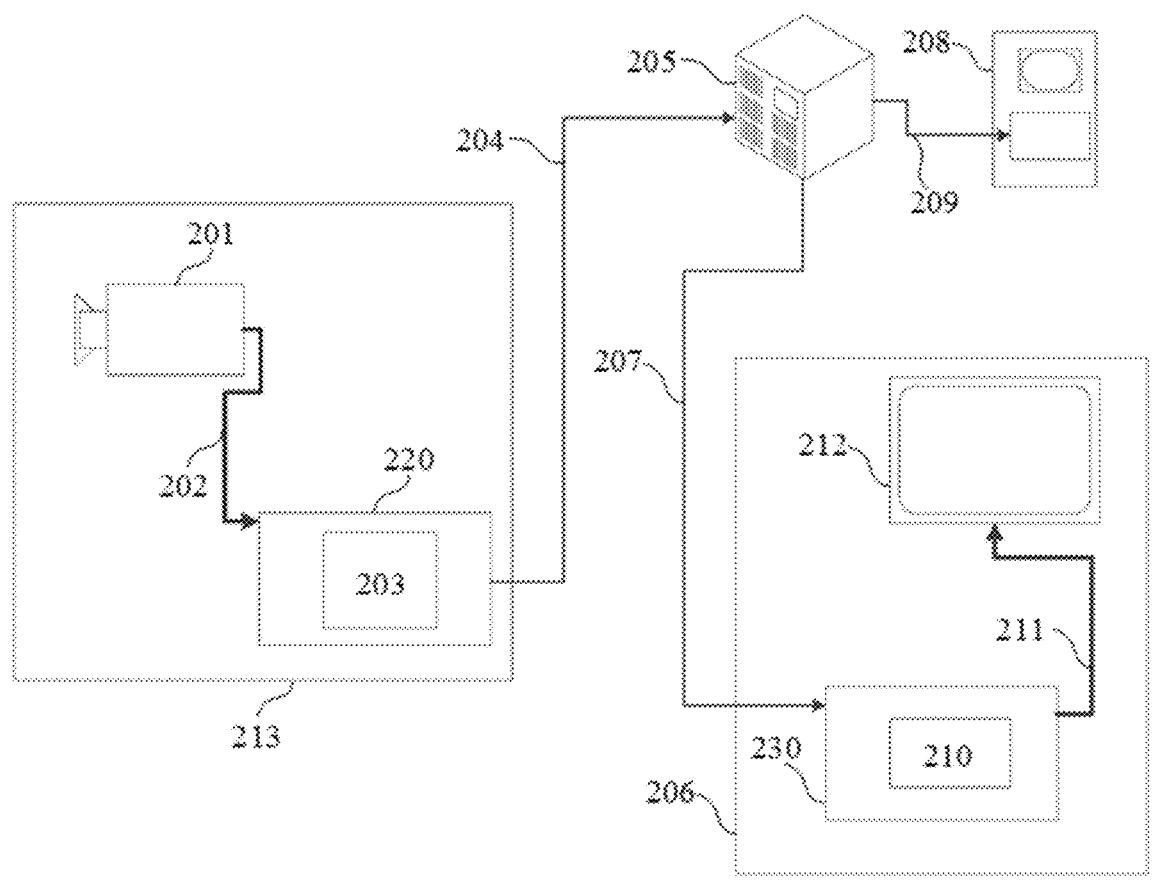
FIG. 2 shows a schematic diagram of placement modes of a video coding apparatus and a video decoding apparatus in a streaming transmission system.

In an embodiment of the present disclosure, FIG. 2 shows placement modes of a video coding apparatus and a video decoding apparatus in a streaming transmission environment. The subject matter disclosed in the present disclosure is equally applicable to other video-enabled applications including, for example, video conferencing, digital television (TV), storing compressed video on digital media including CD, DVD, memory sticks, etc.

A streaming transmission system may include an acquisition subsystem 213. The acquisition subsystem 213 may include a video source 201, such as a digital camera. The video source creates an uncompressed video picture stream 202. In an embodiment, the video picture stream 202 includes samples taken by a digital camera. In contrast to coded video data 204 (or a coded video code stream 204), the video picture stream 202 is depicted as a bold line to emphasize a high-data-volume video picture stream. The video picture stream 202 may be processed by an electronic apparatus 220. The electronic apparatus 220 includes a video coding apparatus 203 coupled to the video source 201. The video coding apparatus 203 may include hardware, software, or a combination of hardware and software to realize or implement aspects of the disclosed subject matter as described in more detail below. In contrast to the video picture stream 202, the coded video data 204 (or the coded video code stream 204) is depicted as a thin line to emphasize low-data-volume coded video data 204 (or the coded video code stream 204), which may be stored on a streaming transmission server 205 for future use. One or more streaming transmission client subsystems, such as a client subsystem 206 and a client subsystem 208 in FIG. 2, may access the streaming transmission server 205 to retrieve a copy 207 and a copy 209 of the coded video data 204. The client subsystem 206 may include, for example, the video decoding apparatus 210 in the electronic apparatus 230. The video decoding apparatus 210 decodes the copy 207 of the coded video data and generates an output video picture stream 211 that may be presented on a display 212 (for example, a display screen) or another presentation apparatus. In some streaming transmission systems, the coded video data 204, video data 207 and video data 209 (for example, video code streams) may be coded according to certain video coding/compression standards. Embodiments of such standards include ITU-T H. 265. In an embodiment, the video coding standard being developed is informally referred to as versatile video coding (VVC), and the present disclosure may be used in the context of the VVC standard.

The electronic apparatus 220 and the electronic apparatus 230 may include other components not shown in the figures. For example, the electronic apparatus 220 may include a video decoding apparatus, and the electronic apparatus 230 may also include a video coding apparatus.

In an embodiment of the present disclosure, taking an international video coding standard: high efficiency video coding (HEVC), versatile video coding (VVC) and a Chinese national video coding standard AVS as examples, when a video frame image is input, the video frame image is divided into a number of non-overlapping processing units according to a block size, and each processing unit will perform a similar compression operation. This processing unit is referred to as a coding tree unit (CTU) or a largest coding unit (LCU). The CTU may be more finely divided to obtain one or more coding units (CU), which are the most elements of a coding link. Some concepts in coding a CU are introduced below:

Predictive coding: the predictive coding includes intra-frame prediction, inter-frame prediction and other modes, and after an original video signal is predicted by a selected reconstructed video signal, a residual video signal is obtained. A coding end determines a corresponding predictive coding pattern for the current CU and to inform of a decoding end. The intra-frame prediction means that a predicted signal comes from a region which has been coded and reconstructed in the same image. The inter-frame prediction means that a predicted signal comes from an already coded image (referred to as a reference image) different from a current image.

Transform & Quantization: after a residual video signal is subjected to transform operations such as discrete Fourier transform (DFT) and DCT, the signal is converted into a transform domain, which is referred to as a transform coefficient. The transform coefficient is further subjected to a lossy quantization operation to lose some information, whereby a quantized signal is advantageous for compression expression. In some video coding standards, there may be more than one selectable transform mode. Therefore, the coding end also selects one of the transform modes for the current CU and inform of the decoding end. The degree of refinement of quantization is usually determined by a quantization parameter (QP). A larger value of the QP indicates that coefficients within a larger range of values will be quantized into the same output. Therefore, more distortion and lower code rate will be brought usually. Conversely, a smaller value of the QP indicates that coefficients within a smaller range of values will be quantized into the same output. Therefore, less distortion will be brought usually while corresponding to a higher code rate.

Entropy coding or statistical coding: a quantized transform domain signal will be statistically compressed and coded according to the frequency of occurrence of each value, and finally a binary (0 or 1) compressed code stream will be output. Meanwhile, other information is generated by coding. For example, a selected coding pattern, motion vector data, etc. also are subjected to entropy coding to reduce the code rate. The statistical coding is a lossless coding mode, which can effectively reduce the code rate desired to express the same signal. Common statistical coding modes include variable length coding (VLC) or context adaptive binary arithmetic coding (CABAC).

Loop filtering: a transformed and quantized signal is processed by inverse quantization, inverse transform, and predictive compensation to obtain a reconstructed image. The reconstructed image is different from an original image in part of the information due to the effect of quantization. That is, the reconstructed image is distorted. Therefore, the reconstructed image may be filtered by a deblocking filter (DB), a sample adaptive offset (SAO) filter or an adaptive loop filter (ALF), and other filters, thereby effectively reducing the degree of distortion generated by quantization. Since these filtered reconstructed images will be used as references for subsequent coded images to predict future image signals, the above filtering operation is also referred to as loop filtering, i.e. a filtering operation within a coding loop.

Figure 3:
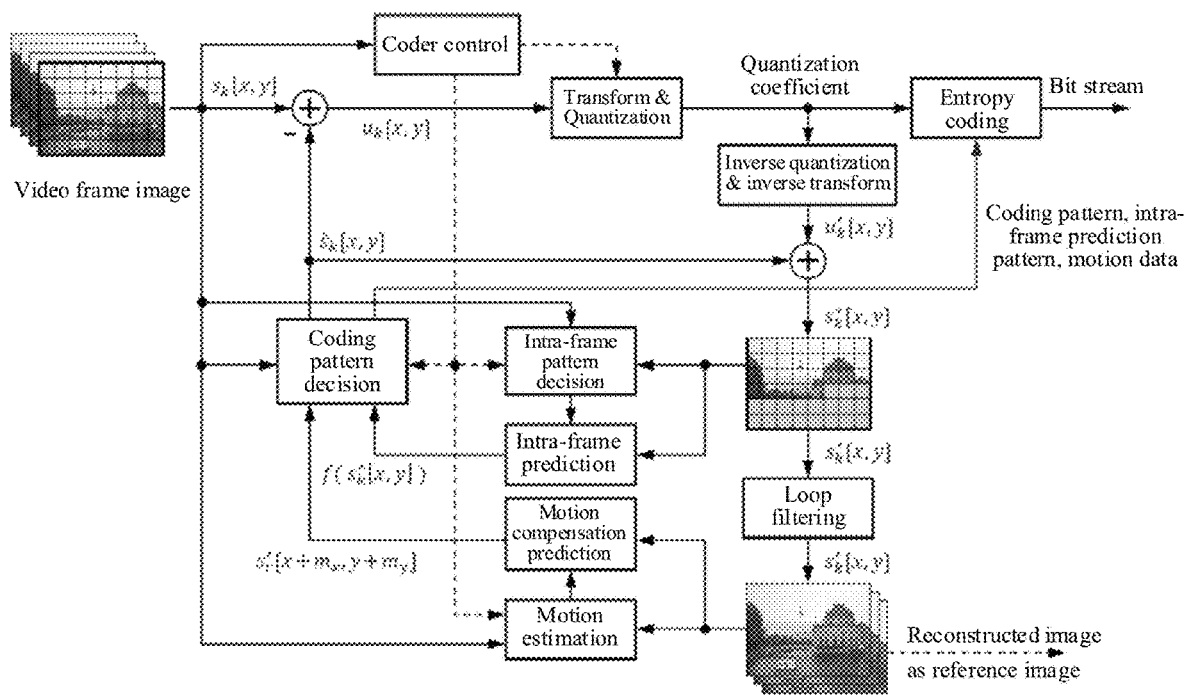
FIG. 3 shows a schematic flowchart of a video coder.

In an embodiment of the present disclosure, FIG. 3 shows a flowchart of a video coder. In this flow, intra-frame prediction is exemplified. A difference operation is performed on an original image signal $s_k[x, y]$ and a prediction image signal $\hat{s}_k[x, y]$ to obtain a residual signal $u_k[x, y]$. The residual signal $u_k[x, y]$ is transformed and quantized to obtain a quantization coefficient. The quantization coefficient, on the one hand, obtains a coded bit stream (video code stream) through entropy coding, and on the other hand obtains a reconstructed residual signal $u'_k[x, y]$ through inverse quantization and inverse transform processing. The prediction image signal $\hat{s}_k[x, y]$ and the reconstructed residual signal $u'_k[x, y]$ are superimposed to generate an image signal $s^*_k[x, y]$. On the one hand, the image signal $s^*_k[x, y]$ is input to an intra-frame pattern decision module and an intra-frame prediction module for intra-frame prediction processing. On the other hand, a reconstructed image signal $s'_k[x, y]$ is output through loop filtering. The reconstructed image signal $s'_k[x, y]$ may be used as a reference image of a next frame for motion estimation and motion compensation prediction. Then, a prediction image signal $\hat{s}_k[x, y]$ of a next frame is obtained based on a result $s'_r[x+m_x, y+m_y]$ of motion compensation prediction and a result $f(s^*_k[x, y])$ of intra-frame prediction, and the above process is repeated until the coding is performed.

Figure 4:
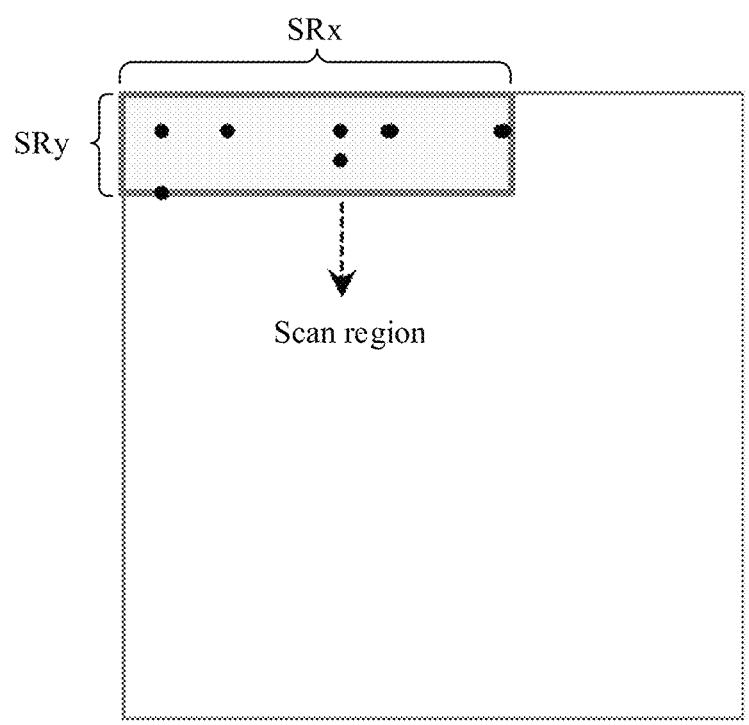
FIG. 4 shows a schematic scan region marked by an SRCC technology.
Figure 5:
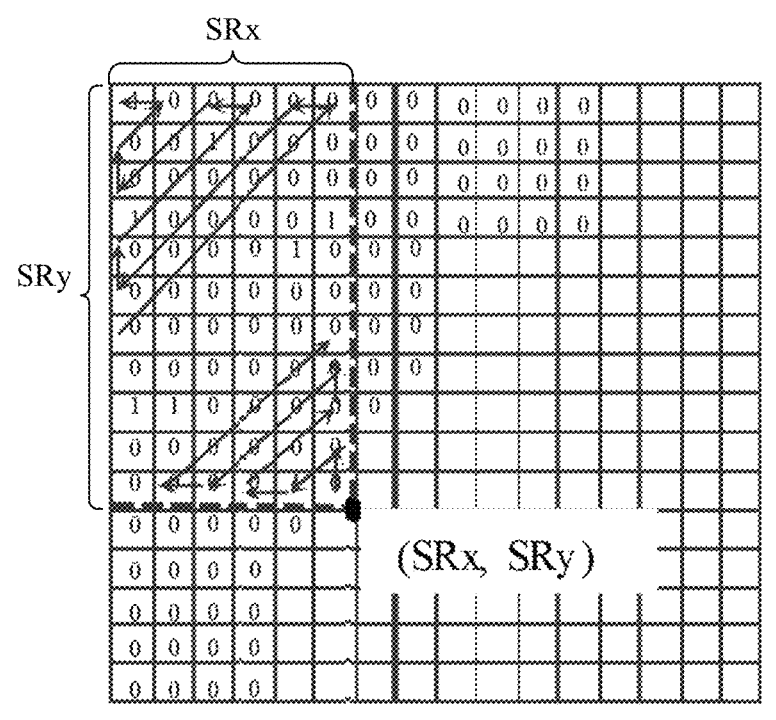

Furthermore, since non-zero coefficients in a quantization coefficient block after a residual signal is transformed and quantized are concentrated in left and upper regions of the block with high probability, while the probability of concentration in right and lower regions of the block is 0, an SRCC technology is introduced, and the size SRx×SRy of an upper left region of non-zero coefficients contained in each quantization coefficient block (with the size of W×H) may be marked by the SRCC technology. SRx is the abscissa of the rightmost non-zero coefficient in the quantization coefficient block, SRy is the ordinate of the lowermost non-zero coefficient in the quantization coefficient block, 1≤SRx≤W, 1≤SRy≤H, and coefficients outside this region are all 0. The SRCC technology uses (SRx, SRy) to determine a quantization coefficient region that is scanned in a quantization coefficient block. As shown in FIG. 4, only quantization coefficients in a scan region marked by (SRx, SRy) are coded. The scan sequence of coding is shown in FIG. 5, and the scan may be inverse Z-shaped scan from the lower right corner to the upper left corner.

Based on the above coding process, entropy decoding is performed on each CU at the decoding end after acquiring a compressed code stream (i.e. bit stream), so as to obtain various pattern information and quantization coefficients. The quantization coefficients are inversely quantized and inversely transformed to obtain a residual signal. On the other hand, according to the known coding pattern information, a prediction signal corresponding to the CU may be obtained, a reconstructed signal may be obtained after adding the residual signal and the prediction signal, and the reconstructed signal is subjected to loop filtering and other operations to generate a final output signal.

In the above coding and decoding process, the residual signal is transformed such that energy of the residual signal is concentrated in fewer low-frequency coefficients. That is, a majority of coefficient values are smaller. After passing through the subsequent quantization module, the smaller coefficient values will become zero, thereby greatly reducing the cost of coding the residual signal. However, due to the diversity of residual distribution, a single DCT cannot adapt to all the residual characteristics. Therefore transform kernels such as DST7 and DCT8 are introduced into the transform process, and different transform kernels may be used for horizontal transform and vertical transform on the residual signal. An adaptive multiple core transform (AMT) technology is taken as an example. A residual signal may be transformed by using the following transform combination: (DCT2, DCT2), (DCT8, DCT8), (DCT8, DST7), (DST7, DCT8), and (DST7, DST7).

It is desirable to determine to select a specific transform combination for the residual signal at the coding end using rate-distortion optimization (RDO). There is also a weak correlation of partial residuals, which may skip the transform process. The residuals of transform skipping are taken as an example. A current transform skipping method in an AVS3 standard skips the transform process of residuals directly. However, due to the characteristics of intra-frame prediction, residual energy in a lower right corner of a residual block is higher. It is difficult to reduce the size of an SRCC region by directly performing coefficient coding, thereby reducing the efficiency of SRCC and thus also affecting the video coding efficiency.

In view of the above problems, according to the embodiments of the present disclosure, an inverse quantization coefficient matrix is inversely rearranged, whereby non-zero coefficients in the inverse quantization coefficient matrix are more concentrated in left, upper and upper left regions of the coefficient matrix. Thus, the area of an SRCC region can be reduced during coding, thereby effectively improving the video coding efficiency.

Implementation details of the technical solutions of the embodiments of the present disclosure are described below in detail.

Figure 6:
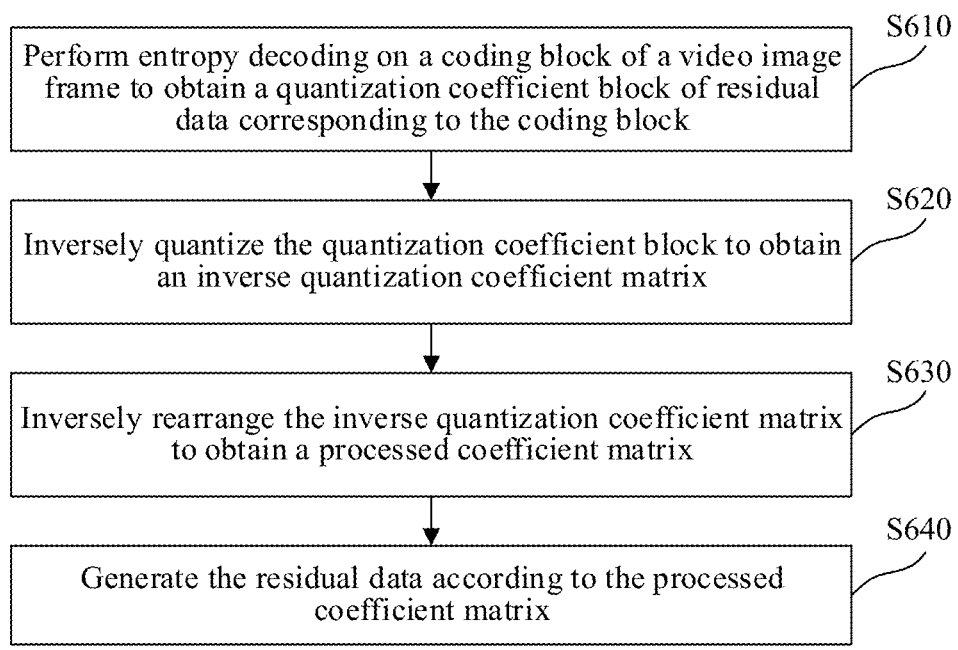
FIG. 6 shows a schematic flowchart of a video decoding method according to certain embodiment(s) of the present disclosure.

FIG. 6 shows a flowchart of a video decoding method according to an embodiment of the present disclosure. The video decoding method may be performed by a computing device such as a terminal device or a server. Referring to FIG. 6, the video decoding method includes at least steps S610 to S640. A detailed description is as follows:

In S610, entropy decoding is performed on a coding block of a video image frame to obtain a quantization coefficient block of residual data corresponding to the coding block.

In an embodiment of the present disclosure, a video image frame sequence includes a series of images. Each image may be further divided into slices, which in turn may be divided into a series of LCUs (or CTUs). The LCU contains a number of CUs. Each image may be referred to as a video picture frame. The video picture frame is coded in units of blocks at the time of coding. There is a macroblock (MB) in some new video coding standards such as standard H.264. The MB may be further divided into a plurality of predictions which may be used for predictive coding. In the HEVC standard, the concepts of CUs, prediction units (PU) and transform units (TU) are used to functionally divide a variety of block units, and a brand-new tree-based structure is used for description. For example, the CU may be divided into smaller CUs according to a quadtree, and the smaller CU may continue to be divided to form a quadtree structure. The coding blocks in the embodiments of the present disclosure may be CUs, or smaller blocks than CUs, such as smaller blocks obtained by dividing CUs.

In S620, the quantization coefficient block is inversely quantized to obtain an inverse quantization coefficient matrix.

The inverse quantization processing is an inverse process of a quantization processing process of a video image frame during coding so as to obtain an inverse quantization coefficient. For example, an inverse quantization scheme corresponding to a quantization processing scheme is applied to perform the inverse quantization processing based on or using the same quantization step size as that during the quantization processing.

In S630, the inverse quantization coefficient matrix is inversely rearranged to obtain a processed coefficient matrix.

Non-zero coefficients in the processed coefficient matrix are concentrated in left, upper and upper left regions of the coefficient matrix.

In an embodiment of the present disclosure, it may be determined whether a corresponding coding block rearranges the obtained inverse quantization coefficient matrix according to at least one of the following modes: a value of an index identifier contained in a sequence header of a coding block corresponding to a video image frame sequence; a value of an index identifier contained in an image header of a coding block corresponding to a video image frame; a coding pattern adopted by a coding block; a size of a coding block; or a value of an index identifier contained in a coding block or an implicit indication of a coefficient statistical result in the quantization coefficient block.

In certain embodiment(s), when it is determined whether a corresponding coding block rearranges the obtained inverse quantization coefficient matrix, there may be the following modes:

1. It is indicated by a value of an index identifier in a sequence header of a coding block corresponding to a video image frame sequence. For example, if a value of an index identifier in a sequence header is 1 (the value is merely an example), it means that all coding blocks corresponding to the video image frame sequence inversely rearrange the obtained inverse quantization coefficient matrix.
2. It is indicated by a value of an index identifier in an image header of a coding block corresponding to a video image frame. For example, if the value of the index identifier in the image header is 1 (the value is merely an example), it means that all coding blocks corresponding to the video image frame inversely rearrange the obtained inverse quantization coefficient matrix.
3. It is indicated by a coding pattern adopted by a coding block. For example, if a coding block adopts an intra-frame coding mode, it means that the coding block inversely rearranges the inverse quantization coefficient matrix.
4. It is indicated by a size of a coding block. For example, if the size of a coding block is less than a set value, it means that the coding block inversely rearranges the obtained inverse quantization coefficient matrix.
5. It is indicated by a value of an index identifier contained in a coding block. For example, if a value of an index identifier contained in a coding block is 1 (the value is merely an example), it means that the coding block inversely rearranges the obtained inverse quantization coefficient matrix.
6. It is indicated by an implicit indication of a coefficient statistical result in the quantization coefficient block. For example, the number of non-zero coefficients, even coefficients, non-zero even coefficients, or odd coefficients in the quantization coefficient block may be calculated, and the parity of the number may be used to implicitly indicate whether the coding block inversely rearranges the obtained inverse quantization coefficient matrix. If the number is an odd number, it means that the coding block inversely rearranges the obtained inverse quantization coefficient matrix. On the contrary, if the number is an even number, it means that the coding block does not need to inversely rearrange the obtained inverse quantization coefficient matrix. In certain embodiment(s), when the number is an odd number, it indicates that the coding block does not need to inversely rearrange the obtained inverse quantization coefficient matrix. If the number is an even number, it means that the coding block inversely rearranges the obtained inverse quantization coefficient matrix.

In an embodiment of the present disclosure, when counting coefficients in the quantization coefficient block, it is possible to count all regions in the quantization coefficient block, or count partial regions in the quantization coefficient block, and it is also possible to count SRCC regions in the quantization coefficient block (such as all SRCC regions or partial SRCC regions). For example, one or more positions specified in the quantization coefficient block are counted, at least one row specified in the quantization coefficient block is counted, at least one column specified in the quantization coefficient block is counted, at least one row and at least one column specified in the quantization coefficient block are counted, positions on at least one diagonal line in the quantization coefficient block are counted, etc. In a possible implementation, partial SRCC regions may be one or more positions specified in the SRCC region, at least one row specified in the SRCC region, at least one column specified in the SRCC region, at least one row and at least one column specified in the SRCC region, positions on at least one diagonal line in the SRCC region, etc.

7. It is indicated by two or more of the above modes 1 to 5.

For example, it may be jointly indicated by a value of an index identifier in a sequence header of a coding block corresponding to a video image frame sequence, a value of an index identifier in an image header of a coding block corresponding to a video image frame, a coding pattern adopted by a coding block, a size of a coding block, and a size of an index identifier contained in a coding block. If a value of an index identifier in a sequence header is 1 (the value is merely an example), a value of an index identifier in an image header is 1 (the value is merely an example), a coding block adopts an intra-frame coding mode, and the size of the coding block is less than a set size, it means that the coding block inversely rearranges the obtained inverse quantization coefficient matrix if a value of an index identifier contained in the coding block is 1 (the value is merely an example).

In the above example, if a value of an index identifier in a sequence header is 1 (the value is merely an example), a value of an index identifier in an image header is 1 (the value is merely an example), a coding block adopts an intra-frame coding mode, and the size of the coding block is less than a set size, it means that the coding block does not need to inversely rearrange the obtained inverse quantization coefficient matrix and the inverse quantization coefficient matrix of the coding block may be inversely transformed by means of DCT if a value of an index identifier contained in the coding block is 0 (the value is merely an example).

8. It is indicated by two or more of the above modes 1 to 4 and 6.

For example, it may be jointly indicated by a value of an index identifier in a sequence header of a coding block corresponding to a video image frame sequence, a value of an index identifier in an image header of a coding block corresponding to a video image frame, a coding pattern adopted by a coding block, a size of a coding block, and a coefficient statistical result in the quantization coefficient block. In certain embodiment(s), if a value of an index identifier in a sequence header is 1 (the value is merely an example), a value of an index identifier in an image header is 1 (the value is merely an example), a coding block adopts an intra-frame coding mode, and the size of the coding block is less than a set size, it means that the coding block inversely rearranges the obtained inverse quantization coefficient matrix if a statistical result of a quantization coefficient block corresponding to the coding block is a first value (the first value may be, for example, an odd value, which is merely an example).

In the above example, if a value of an index identifier in a sequence header is 1 (the value is merely an example), a value of an index identifier in an image header is 1 (the value is merely an example), a coding block adopts an intra-frame coding mode, and the size of the coding block is less than a set size, it means that the coding block does not need to inversely rearrange the obtained inverse quantization coefficient matrix and the inverse quantization coefficient matrix of the coding block may be inversely transformed by means of DCT if a statistical result of a quantization coefficient block corresponding to the coding block is a second value (the second value may be, for example, an even value, which is merely an example).

9. It is indicated by means of an explicit index identifier+ an implicitly derived index value.

For example, quantization coefficients in the quantization coefficient block may be counted to obtain an implicitly derived index value. If a value of an explicit index identifier contained in a coding block is a first value (the first value of the explicit index identifier may be, for example, 0 or 1) and the implicitly derived index value is a first value (the first value of the implicitly derived index value may also be, for example, 0 or 1), it is determined that the coding blockskips inverse transform processing and the inverse quantization coefficient matrix corresponding to the coding block is inversely rearranged. If a value of an explicit index identifier contained in a coding block is a first value and the implicitly derived index value is a second value, it is determined that the coding block skips inverse transform processing and the inverse quantization coefficient matrix corresponding to the coding block is not inversely rearranged. If a value of an explicit index identifier contained in the coding block is a second value, it is determined that the coding block inversely transforms the obtained inverse quantization coefficient matrix by means of DCT.

In the above example, if a value of an explicit index identifier contained in a coding block is 0 (the value is merely an example) and the implicitly derived index value is 1, it is determined that the coding block skips inverse transform processing and the obtained inverse quantization coefficient matrix is inversely rearranged. If a value of an explicit index identifier contained in a coding block is 0 and the implicitly derived index value is 0, it is determined that the coding block skips inverse transform processing and the obtained inverse quantization coefficient matrix does not need to be inversely rearranged. If a value of an explicit index identifier contained in the coding block is 1, it is determined that the coding block inversely transforms the obtained inverse quantization coefficient matrix by means of DCT. The details are shown in Table 1 below:

TABLE 1

| Explicit index identifier | Implicitly derived index value | Transform pattern | Inverse rearrangement processing |
|---|---|---|---|
| 1 | — | DCT2 | No |
| 0 | 0 | TS | No |
|   | 1 | TS | Yes |

The case where the value of the explicit index identifier in Table 1 is "1" and the implicitly derived index value is "-" represents: when the value of the explicit index identifier is 1, the transform pattern is DCT2 regardless of the value of the implicitly derived index, and no inverse rearrangement processing is desired. In this case, the coding end does not need to adjust the quantization coefficient block for implicit indication, nor does the decoding end perform the process of implicitly deriving an index. "TS" in Table 1 represents a transform skipping pattern. That is, the transform process is skipped during coding and the inverse transform process is skipped during decoding.

In an embodiment of the present disclosure, the process of counting quantization coefficients in the quantization coefficient block to obtain an implicitly derived index value may be: counting quantization coefficients within a specified region in the quantization coefficient block to obtain a coefficient statistical result of the quantization coefficients, and determining an implicitly derived index value according to the parity of the coefficient statistical result. The technical solution of this embodiment is to determine an implicitly derived index value based on the parity of a coefficient statistical result. For example, if the coefficient statistical result is an odd number, the implicitly derived index value may be 1. If the coefficient statistical result is an even number, the implicitly derived index value may be 0. In certain embodiment(s), if the coefficient statistical result is an odd number, the implicitly derived index value may also be 0. Then, if the coefficient statistical result is an even number, the implicitly derived index value may be 1.

In an embodiment of the present disclosure, the process of counting quantization coefficients in the quantization coefficient block to obtain an implicitly derived index value may be: counting quantization coefficients within a specified region in the quantization coefficient block to obtain a coefficient statistical result of the quantization coefficients, calculating a remainder of the coefficient statistical result with respect to a set value, and determining an implicitly derived index value according to the remainder. The technical solution of this embodiment is to determine an implicitly derived index value for a remainder of a set value based on a statistical result. This solution enables more than two possible values of the implicitly derived index value. For example, the set value may be 3. In this case, remainders of a coefficient statistical result 3 may be 0, 1 and 2. Each remainder may correspond to an implicitly derived index value. For example, the remainder may be directly used as the implicitly derived index value.

In an embodiment of the present disclosure, the inverse rearrangement processing may be rotation processing, or rotation processing and partial coefficient rearrangement. Therefore, the implementation of inversely rearranging the inverse quantization coefficient matrix may be rotating the inverse quantization coefficient matrix, or performing rotation processing and partial coefficient rearrangement on the inverse quantization coefficient matrix.

In an embodiment of the present disclosure, the rotating the inverse quantization coefficient matrix may be rotating all regions or partial regions of the inverse quantization coefficient matrix; or flipping all regions or partial regions of the inverse quantization coefficient matrix; or rotating all regions or partial regions of the inverse quantization coefficient matrix, and flipping all regions or partial regions of the inverse quantization coefficient matrix.

In an embodiment of the present disclosure, the rotating all regions or partial regions of the inverse quantization coefficient matrix includes: rotating all regions or partial regions of the inverse quantization coefficient matrix by n×90° in a given direction, where n is a non-negative integer (for example, n may be 0, 1, 2, 3, 4, etc.). The given direction may be a clockwise direction, a counterclockwise direction, etc.

Figure 7A:
Figure 7B:

For example, as shown in FIG. 7A, all regions of the inverse quantization coefficient matrix may be rotated by 90° clockwise. Or as shown in FIG. 7B, all regions of the inverse quantization coefficient matrix are rotated by 180° clockwise. Or as shown in FIG. 7C, all regions of the inverse quantization coefficient matrix are rotated by 270° clockwise.

In an embodiment of the present disclosure, the flipping all regions or partial regions of the inverse quantization coefficient matrix includes at least one of the following: flipping all regions or partial regions of the inverse quantization coefficient matrix along a main diagonal, flipping all regions or partial regions of the inverse quantization coefficient matrix along a counter-diagonal, flipping all regions or partial regions of the inverse quantization coefficient matrix left and right, and flipping all regions or partial regions of the inverse quantization coefficient matrix up and down.

Figures 7C, 8A, 8B:
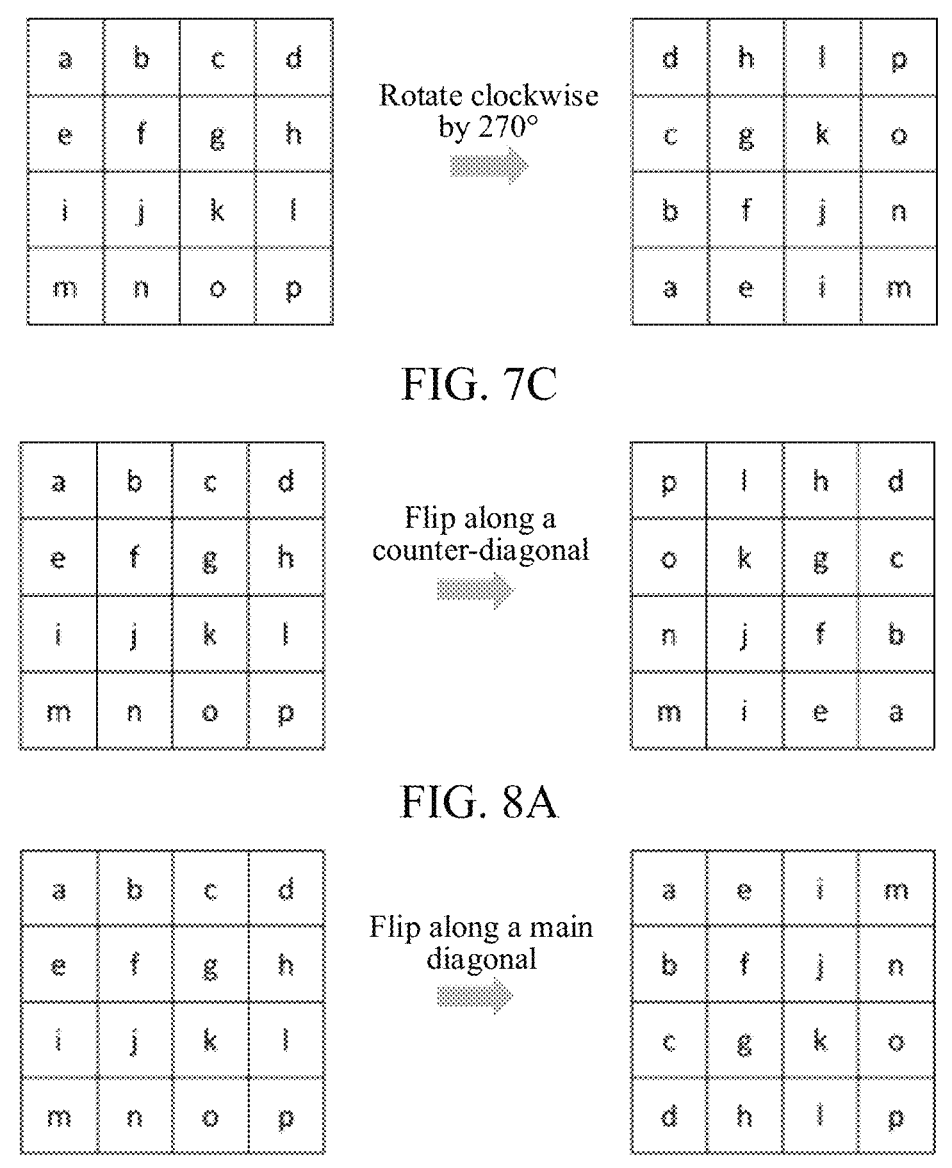
Figure 8C:
Figure 8D:

For example, as shown in FIG. 8A, all regions of the inverse quantization coefficient matrix may be flipped along a counter-diagonal. As shown in FIG. 8B, all regions of the inverse quantization coefficient matrix may be flipped along a main diagonal. As shown in FIG. 8C, all regions of the inverse quantization coefficient matrix may be flipped left and right along a vertical central axis. As shown in FIG. 8D, all regions of the inverse quantization coefficient matrix may be flipped up and down along a horizontal central axis.

In an embodiment of the present disclosure, when flipping the inverse quantization coefficient matrix, a flipping mode of the inverse quantization coefficient matrix may be determined according to a relationship between the width and height of the inverse quantization coefficient matrix, and the inverse quantization coefficient matrix is flipped based on the determined flipping mode.

For example, if the width and height of the inverse quantization coefficient matrix are equal, it is determined that the inverse quantization coefficient matrix is flipped along the main diagonal or the counter-diagonal of the inverse quantization coefficient matrix, as shown in the embodiments of FIGS. 8A and 8B. In certain embodiment(s), if the width and height of the inverse quantization coefficient matrix are equal, an up-down flipping mode or a left-right flipping mode may also be used, and at least two of left-right flipping, up-down flipping, flipping along the counter-diagonal of the inverse quantization coefficient matrix and flipping along the main diagonal of the inverse quantization coefficient matrix may also be used.

If the width of the inverse quantization coefficient matrix is greater than the height, it is determined that the inverse quantization coefficient matrix is flipped left and right, as shown in the embodiment of FIG. 8C. If the width of the inverse quantization coefficient matrix is less than the height, it is determined that the inverse quantization coefficient matrix is flipped up and down, as shown in the embodiment of FIG. 8D.

In an embodiment of the present disclosure, when flipping all regions or partial regions of the inverse quantization coefficient matrix, a flipping mode of the inverse quantization coefficient matrix may be determined according to an intra-frame prediction pattern adopted by a coding block, and all regions or partial regions of the inverse quantization coefficient matrix are flipped based on the determined flipping mode.

In response to the intra-frame prediction pattern of the coding block directing towards the lower left, it is determined that the inverse quantization coefficient matrix is flipped up and down. In response to the intra-frame prediction pattern of the coding block directing towards the upper right, it is determined that the inverse quantization coefficient matrix is flipped left and right.

Figure 9:
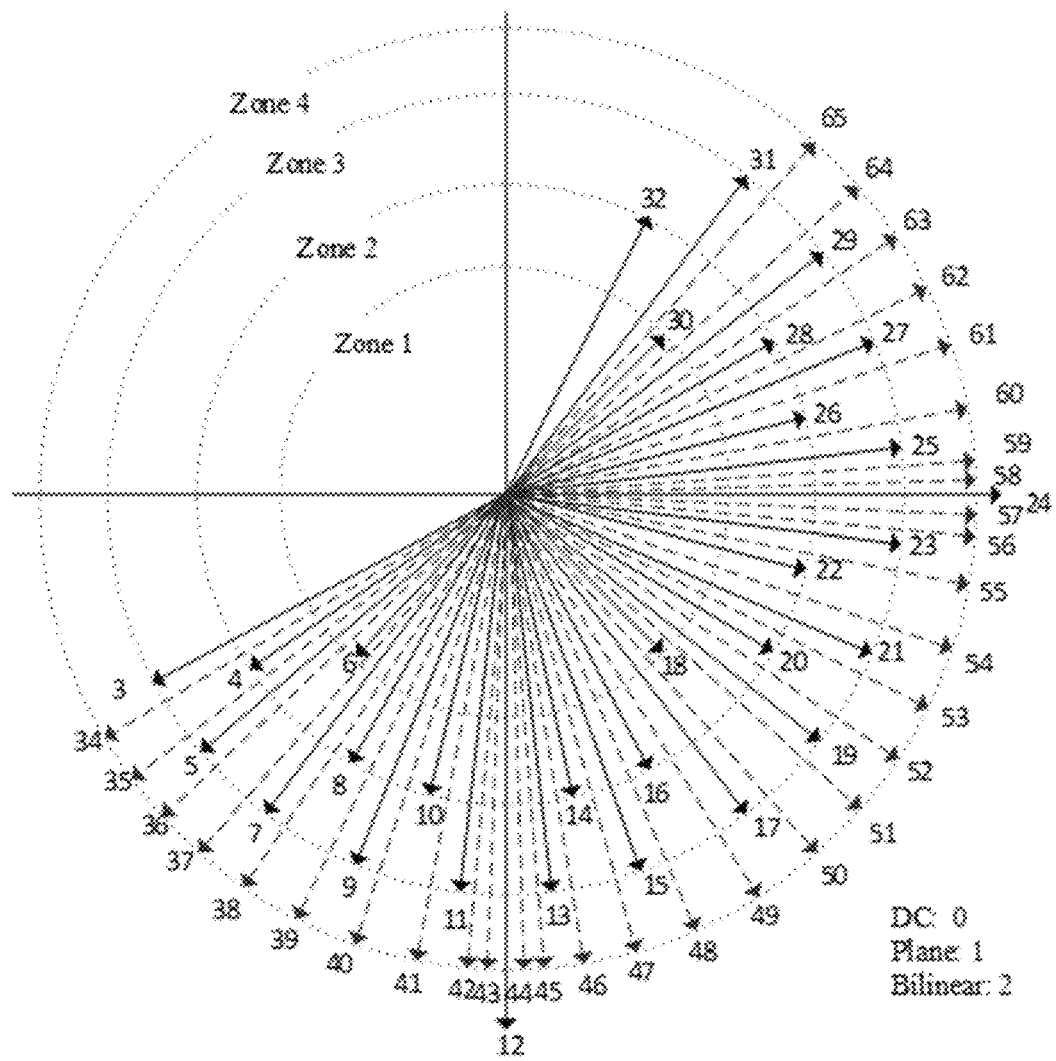
FIG. 9 shows a schematic diagram of a prediction direction in an intra-frame prediction pattern.

In an embodiment of the present disclosure, as shown in FIG. 9, the intra-frame prediction patterns directing towards the lower left may be patterns 3 to 11, 34 to 43. The intra-frame prediction patterns directing towards the upper right may be patterns 25 to 32, 58 to 65.

In an embodiment of the present disclosure, in response to the intra-frame prediction pattern of the coding block being another intra-frame prediction pattern other than directing towards the lower left and the upper right, a flip mode of the inverse quantization coefficient matrix is determined according to a relationship between the width and height of the inverse quantization coefficient matrix. As shown in FIG. 9, other intra-frame prediction patterns in this embodiment may be patterns 0 to 2, 12 to 24, 44 to 57. Pattern 0 represents a DC prediction pattern, pattern 1 represents a Plane prediction pattern, and Pattern 2 represents a Bilinear prediction pattern. The solution of determining a flip mode of the inverse quantization coefficient matrix according to a relationship between the width and height of the inverse quantization coefficient matrix in this embodiment may be referred to as the technical solutions of the embodiments, and will not be described in detail.

In an embodiment of the present disclosure, when performing rotation processing and partial coefficient rearrangement processing on the inverse quantization coefficient matrix, the rotation processing and the rearrangement processing are not strictly in the order, and the rotation processing may be performed ahead of the rearrangement processing. Or the rearrangement processing may be performed ahead of the rotation processing. The rotation processing and the rearrangement processing may also be performed simultaneously. The rearrangement processing may be to rearrange at least two coefficients in the inverse quantization coefficient matrix, e.g. exchanging positions of two coefficients, randomly disordering and rearranging a plurality of coefficients therein, etc.

Figure 10:
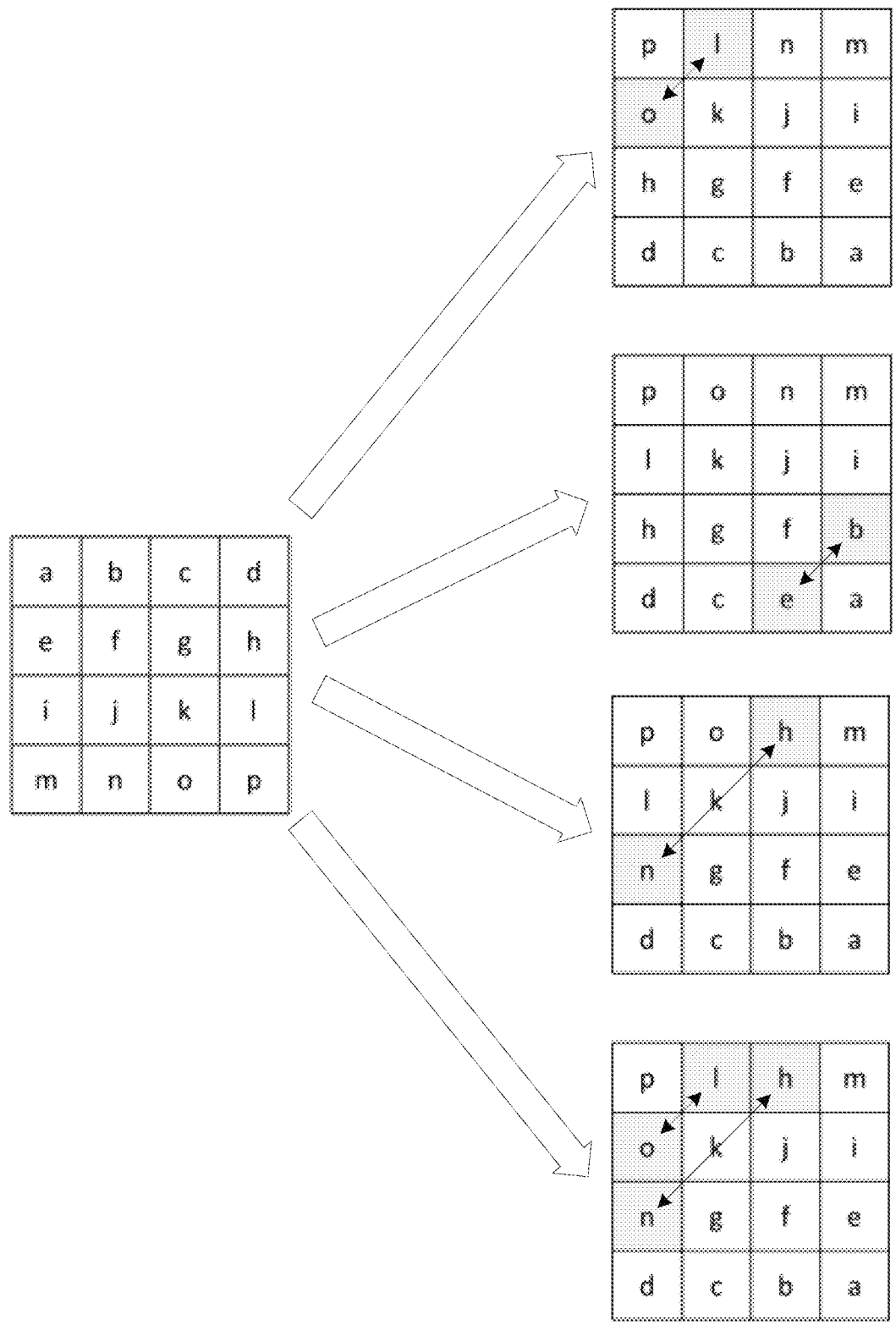
FIG. 10 shows a schematic diagram of flipping and rearranging an inverse quantization coefficient matrix according to certain embodiment(s) of the present disclosure.

For example, in an embodiment of the present disclosure, as shown in FIG. 10, after rotating all regions of the inverse quantization coefficient matrix by 180°, the coefficients of the shaded portion therein may be respectively exchanged in a rearrangement mode indicated by an arrow therein to obtain a processed coefficient matrix. This embodiment is an embodiment where all regions of the inverse quantization coefficient matrix are rotated and partial coefficients are rearranged.

Figure 11:
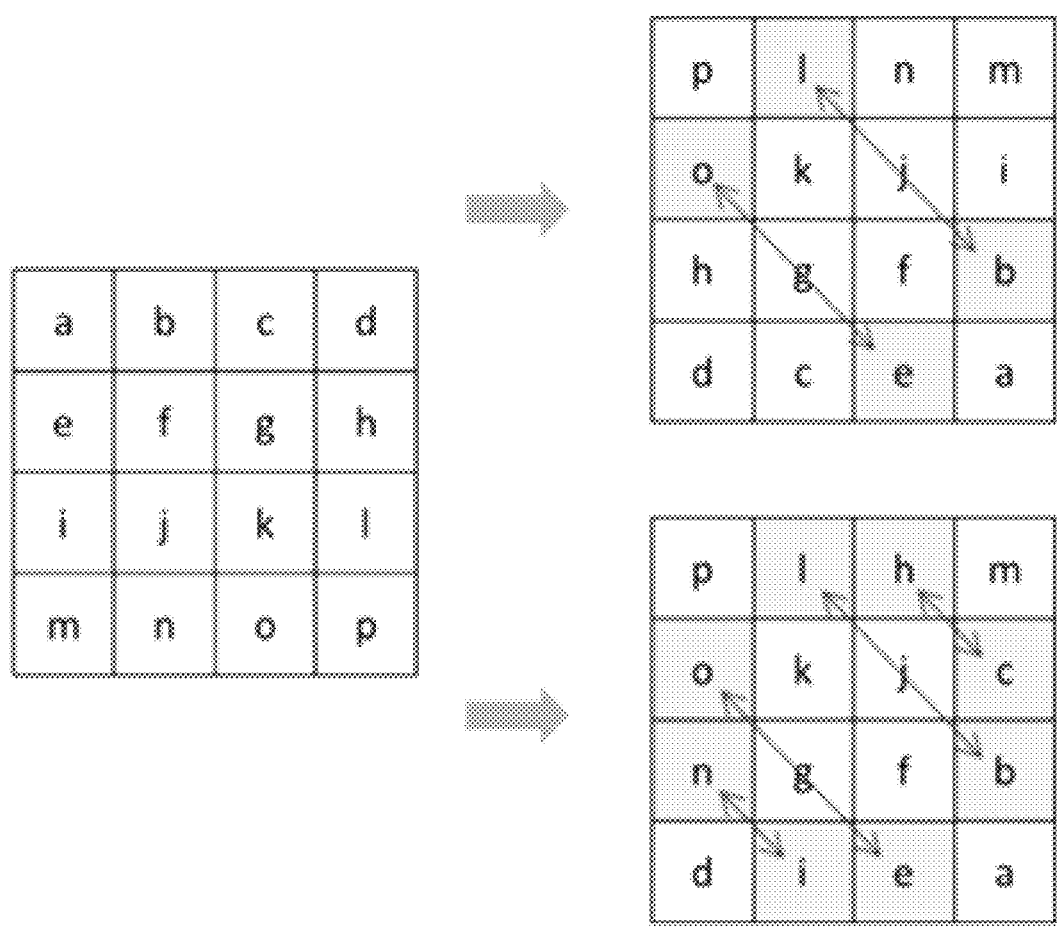
FIG. 11 shows a schematic diagram of flipping and rearranging an inverse quantization coefficient matrix according to certain embodiment(s) of the present disclosure.

For another example, in an embodiment of the present disclosure, as shown in FIG. 11, partial regions (regions other than the shaded portion in FIG. 11) of the inverse quantization coefficient matrix may be rotated by 180°, and the coefficients of the shaded portion therein may be respectively exchanged in a rearrangement mode indicated by an arrow therein to obtain a processed coefficient matrix. This embodiment is an embodiment where partial regions of the inverse quantization coefficient matrix are rotated and partial coefficients are rearranged.

In S640, the residual data is generated according to the processed coefficient matrix.

In an embodiment of the present disclosure, the processed coefficient matrix may be used as reconstructed residual data, or other processing may be performed on the processed coefficient matrix to obtain residual data. In certain embodiment(s), the coding end performs transform or transform skipping processing on the residual data, a coefficient matrix is rearranged, and quantization processing and entropy coding processing are performed. After acquiring a coding block, the decoding end performs entropy decoding and inverse quantization processing, inversely rearranges the coefficient matrix (this process is the inverse process of the coding end), and performs transform or transform skipping processing to obtain the reconstructed residual data.

According to the technical solutions provided by the above embodiments of the present disclosure, non-zero coefficients in an inverse quantization coefficient matrix can be more concentrated in left, upper and upper left regions of the coefficient matrix by inversely rearranging the inverse quantization coefficient matrix. Thus, the area of an SRCC region can be reduced during coding, thereby effectively improving the video coding efficiency.

The following describes the apparatus embodiments of the present disclosure, which may be configured to perform the video decoding method in the embodiments of the present disclosure. For details not disclosed in the apparatus embodiments of the present disclosure, reference is made to the embodiments of the video decoding method of the present disclosure.

Figure 12:
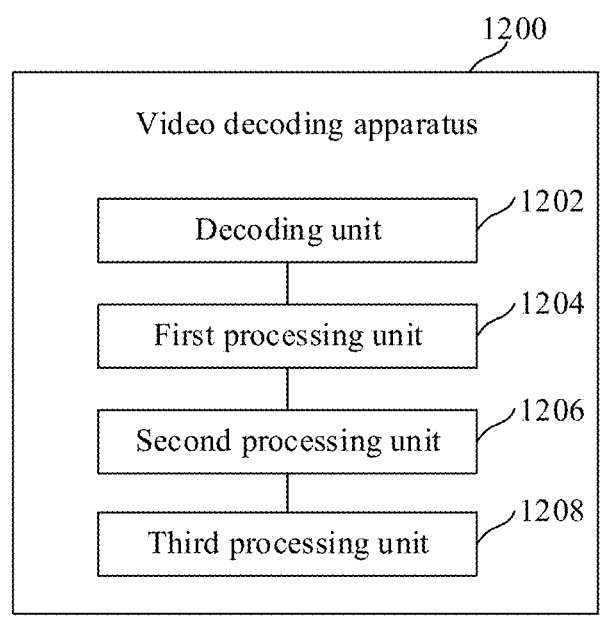
FIG. 12 shows a schematic block diagram of a video coding apparatus according to certain embodiment(s) of the present disclosure.

FIG. 12 shows a block diagram of a video decoding apparatus according to an embodiment of the present disclosure. The video decoding apparatus may be arranged in a computing device such as a terminal device or a server.

Referring to FIG. 12, a video decoding apparatus 1200 according to an embodiment of the present disclosure includes: a decoding unit 1202, a first processing unit 1204, a second processing unit 1206, and a third processing unit 1208.

The decoding unit 1202 is configured to perform entropy decoding on a coding block of a video image frame to obtain a quantization coefficient block of residual data corresponding to the coding block. The first processing unit 1204 is configured to inversely quantize the quantization coefficient block to obtain an inverse quantization coefficient matrix. The second processing unit 1206 is configured to inversely rearrange the inverse quantization coefficient matrix to obtain a processed coefficient matrix, non-zero coefficients in the processed coefficient matrix being concentrated in left, upper and upper left regions of the coefficient matrix. The third processing unit 1208 is configured to generate the residual data according to the processed coefficient matrix.

In some embodiments of the present disclosure, based on the solution, the inversely rearranging, by the second processing unit 1206, the inverse quantization coefficient matrix includes: rotating the inverse quantization coefficient matrix, or performing rotation processing and partial coefficient rearrangement on the inverse quantization coefficient matrix.

In some embodiments of the present disclosure, based on the solution, the rotating, by the second processing unit 1206, the inverse quantization coefficient matrix includes at least one of the following: rotating all regions or partial regions of the inverse quantization coefficient matrix; and flipping all regions or partial regions of the inverse quantization coefficient matrix.

In some embodiments of the present disclosure, based on the solution, the rotating, by the second processing unit 1206, all regions or partial regions of the inverse quantization coefficient matrix includes: rotating all regions or partial regions of the inverse quantization coefficient matrix by n×90° in a given direction, where n is a non-negative integer.

In some embodiments of the present disclosure, based on the solution, the flipping, by the second processing unit 1206, all regions or partial regions of the inverse quantization coefficient matrix includes at least one of the following: flipping all regions or partial regions of the inverse quantization coefficient matrix along a main diagonal, flipping all regions or partial regions of the inverse quantization coefficient matrix along a counter-diagonal, flipping all regions or partial regions of the inverse quantization coefficient matrix left and right, and flipping all regions or partial regions of the inverse quantization coefficient matrix up and down.

In some embodiments of the present disclosure, based on the solution, the flipping, by the second processing unit 1206, all regions or partial regions of the inverse quantization coefficient matrix includes: determining a flip mode of the inverse quantization coefficient matrix according to an intra-frame prediction pattern adopted by the coding block; and flipping all regions or partial regions of the inverse quantization coefficient matrix based on the flip mode.

In some embodiments of the present disclosure, based on the solution, the second processing unit 1206 is configured to: determine that the inverse quantization coefficient matrix is flipped up and down in response to the intra-frame prediction pattern of the coding block directing towards the lower left; determine that the inverse quantization coefficient matrix is flipped left and right in response to the intra-frame prediction pattern of the coding block directing towards the upper right; determine a flip mode of the inverse quantization coefficient matrix according to a relationship between the width and height of the inverse quantization coefficient matrix in response to the intra-frame prediction pattern of the coding block being another intra-frame prediction pattern other than directing towards the lower left and the upper right.

In some embodiments of the present disclosure, based on the solution, the second processing unit 1206 is configured to: rotate the inverse quantization coefficient matrix and rearrange at least two coefficients.

In some embodiments of the present disclosure, based on the solution, the second processing unit 1206 is configured to: determine whether a corresponding coding block rearranges the obtained inverse quantization coefficient matrix according to at least one of the following modes: a value of an index identifier contained in a sequence header of a coding block corresponding to a video image frame sequence; a value of an index identifier contained in an image header of a coding block corresponding to a video image frame; a coding pattern adopted by a coding block; a size of a coding block; or a value of an index identifier contained in a coding block or an implicit indication of a coefficient statistical result in the quantization coefficient block.

In some embodiments of the present disclosure, based on the solution, the second processing unit 1206 is configured to: determine that an inverse quantization coefficient matrix of the target coding block is inversely rearranged in a case where a coefficient statistical result of the quantization coefficient block corresponding to the target coding block is a first value in response to an index identifier contained in a sequence header of a coding block corresponding to a video image frame sequence and an index identifier contained in an image header of a coding block corresponding to a video image frame in the video image frame sequence being both specified values, a coding pattern adopted by a target coding block in the coding block corresponding to the video image frame being an intra-frame coding pattern, and a size of the target coding block being less than a set size.

In some embodiments of the present disclosure, based on the solution, the second processing unit 1206 is configured to: determine that an inverse quantization coefficient matrix of the target coding block is inversely transformed by means of DCT in a case where a coefficient statistical result of the quantization coefficient block corresponding to the target coding block is a second value in response to an index identifier contained in a sequence header of a coding block corresponding to a video image frame sequence and an index identifier contained in an image header of a coding block corresponding to a video image frame in the video image frame sequence being both specified values, a coding pattern adopted by a target coding block in the coding block corresponding to the video image frame being an intra-frame coding pattern, and a size of the target coding block being less than a set size.

In some embodiments of the present disclosure, based on the solution, in response to determining whether a corresponding coding block inversely rearranges the obtained inverse quantization coefficient matrix at least according to an implicit indication of a coefficient statistical result in the quantization coefficient block, the second processing unit 1206 is further configured to: calculate the number of non-zero coefficients, even coefficients, non-zero even coefficients or odd coefficients within a specified region in the quantization coefficient block, and take the parity of the number as a coefficient statistical result in the quantization coefficient block, the specified region including all regions in the quantization coefficient block or an SRCC region in the quantization coefficient block.

In some embodiments of the present disclosure, based on the solution, the second processing unit 1206 is further configured to: count quantization coefficients in the quantization coefficient block to obtain an implicitly derived index value; and determine whether the coding blockskips inverse transform processing and whether the obtained inverse quantization coefficient matrix is inversely rearranged according to the implicitly derived index value and a value of an explicit index identifier contained in the coding block.

In some embodiments of the present disclosure, based on the solution, the second processing unit 1206 is further configured to: determine that the coding block skips inverse transform processing and the inverse quantization coefficient matrix corresponding to the coding block is inversely rearranged in response to a value of an explicit index identifier contained in the coding block being a first value and the implicitly derived index value being a first value; determine that the coding block skips inverse transform processing and the inverse quantization coefficient matrix corresponding to the coding block does not need to be inversely rearranged in response to a value of an explicit index identifier contained in the coding block being a first value and the implicitly derived index value being a second value; and determine that the coding block inversely transforms the obtained inverse quantization coefficient matrix by means of DCT in response to a value of an explicit index identifier contained in the coding block being a second value.

Figure 13:
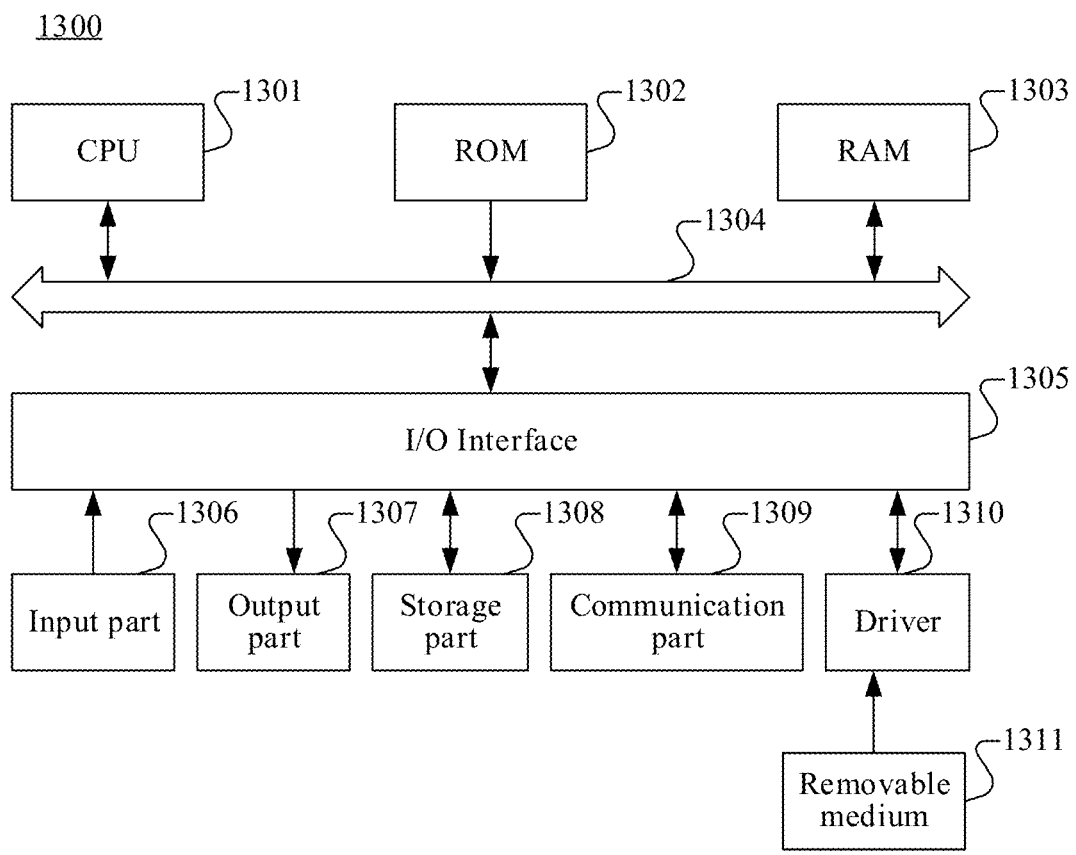
FIG. 13 is a schematic structural diagram of a computer system adapted to implement an electronic device according to certain embodiment(s) of the present disclosure.

FIG. 13 is a schematic structural diagram of a computer system adapted to implement an electronic device according to an embodiment of the present disclosure.

The computer system 1300 of the electronic device shown in FIG. 13 is merely an example, and does not constitute any limitation on functions and use ranges of the embodiments of the present disclosure.

As shown in FIG. 13, the computer system 1300 includes a central processing unit (CPU) 1301, which can execute various appropriate actions and processing according to a program stored in a read-only memory (ROM) 1302 or a program loaded from a storage part 1308 to a random access memory (RAM) 1303, such as performing the methods described in the embodiments. The RAM 1303 further stores various programs and data desired for operating the system.

The CPU 1301, the ROM 1302, and the RAM 1303 are connected to each other through a bus 1304. An input/output (I/O) interface 1305 is also connected to the bus 1304.

The following components are connected to the I/O interface 1305 includes an input part 1306 including a keyboard, a mouse, or the like; an output part 1307 including a cathode ray tube (CRT), a liquid crystal display (LCD), a speaker, or the like; a storage part 1308 including hard disk, or the like; and a communication part 1309 including a network interface card such as a local area network (LAN) card, a modem, or the like. The communication part 1309 performs communication processing by using a network such as the Internet. A driver 1310 is also connected to the I/O interface 1305 as desired. A removable medium 1311, such as a disk, an optical disc, a magneto-optical disc, or a semiconductor memory, is installed on the driver 1310 as desired, so that a computer program read from the removable medium 1311 is installed in the storage part 1308 as desired.

Particularly, according to an embodiment of the present disclosure, the processes described above by referring to the flowcharts may be implemented as computer software programs. For example, an embodiment of the present disclosure includes a computer program product. The computer program product includes a computer program stored in a computer-readable medium. The computer program includes a computer program used for performing a method shown in the flowchart. In such an embodiment, the computer program may be downloaded and installed through the communication part 1309 from a network, and/or installed from the removable medium 1311. When the computer program is executed by the CPU 1301, the various functions defined in the system of the present disclosure are executed.

The computer-readable medium shown in the embodiments of the present disclosure may be a computer-readable signal medium or a computer-readable storage medium or any combination of two. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, a computer-readable signal medium may include a data signal in a baseband or propagated as a part of a carrier wave, the data signal carrying a computer-readable computer program. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments of the present disclosure. Each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of the present disclosure may be implemented in a software manner, or may be implemented in a hardware manner, and the unit described may also be set in a processor. Names of the units do not constitute a limitation on the units in a specific case.

In another aspect, the present disclosure further provides a computer readable medium. The computer readable medium may be included in the electronic device described in the above embodiments, or may exist alone without being assembled into the electronic device. The computer-readable medium carries one or more programs, the one or more programs, when executed by the electronic device, causing the electronic device to implement the method described in the embodiments.

Although a plurality of modules or units of a device configured to perform actions are discussed in the detailed description, such division is not mandatory. Actually, according to the implementations of the present disclosure, the features and functions of two or more modules or units described above may be implemented in one module or unit. Conversely, features and functions of one module or unit described above may be further divided into a plurality of modules or units for implementation.

Through the descriptions of the implementations, a person skilled in the art easily understands that the exemplary implementations described herein may be implemented through software, or may be implemented through software located in combination with suitable hardware. Therefore, the technical solutions of the embodiments of the present disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of the present disclosure.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

After considering the present disclosure and practicing the disclosed embodiments, a person skilled in the art may easily conceive of other implementations of the present disclosure. The present disclosure is intended to cover any variations, uses or adaptive changes of the present disclosure. Such variations, uses or adaptive changes follow the general principles of the present disclosure, and include knowledge and technical means not disclosed in the present disclosure.

It is to be understood that the present disclosure is not limited to the precise structures described above and shown in the accompanying drawings, and various modifications and changes can be made without departing from the scope of the present disclosure. The scope of the present disclosure is limited by the appended claims only.

What is claimed is:

1. A video decoding method, performed by a computing device, the method comprising:
    performing entropy decoding on a coding block of a video image frame to obtain a quantization coefficient block of residual data corresponding to the coding block;
    inversely quantizing the quantization coefficient block to obtain an inverse quantization coefficient matrix;
    counting quantization coefficients in the quantization coefficient block to obtain an implicitly derived index value;
    determining whether to skip inverse transform processing of the coding block and whether to inversely rearrange the inverse quantization coefficient matrix according to the implicitly derived index value and a value of an explicit index identifier contained in the coding block;
    in response to determining that the inverse quantization coefficient matrix is to be inversely rearranged, inversely rearranging the inverse quantization coefficient matrix to obtain a processed coefficient matrix, non-zero coefficients in the processed coefficient matrix being concentrated in left, upper and upper left regions of the coefficient matrix; and
    generating the residual data according to the processed coefficient matrix.

2. The video decoding method according to claim 1, wherein inversely rearranging the inverse quantization coefficient matrix comprises:
    rotating the inverse quantization coefficient matrix, or performing rotation processing and partial coefficient rearrangement on the inverse quantization coefficient matrix.

3. The video decoding method according to claim 2, wherein rotating the inverse quantization coefficient matrix comprises one or both of:
    rotating all regions or partial regions of the inverse quantization coefficient matrix; and
    flipping all regions or partial regions of the inverse quantization coefficient matrix.

4. The video decoding method according to claim 3, wherein rotating all regions or partial regions of the inverse quantization coefficient matrix comprises:
    rotating all regions or partial regions of the inverse quantization coefficient matrix by n×90° in a given direction, wherein n is a non-negative integer.

5. The video decoding method according to claim 3, wherein flipping all regions or partial regions of the inverse quantization coefficient matrix comprises one or more of:
    flipping all regions or partial regions of the inverse quantization coefficient matrix along a main diagonal;
    flipping all regions or partial regions of the inverse quantization coefficient matrix along a counter-diagonal;
    flipping all regions or partial regions of the inverse quantization coefficient matrix left and right; and
    flipping all regions or partial regions of the inverse quantization coefficient matrix up and down.

6. The video decoding method according to claim 3, wherein flipping all regions or partial regions of the inverse quantization coefficient matrix comprises:
    determining a flip mode of the inverse quantization coefficient matrix according to an intra-frame prediction pattern adopted by the coding block; and
    flipping all regions or partial regions of the inverse quantization coefficient matrix based on the flip mode.

7. The video decoding method according to claim 6, wherein determining the flip mode comprises:
    in response to the intra-frame prediction pattern of the coding block directing towards the lower left, determining that the inverse quantization coefficient matrix is flipped up and down;
    in response to the intra-frame prediction pattern of the coding block directing towards the upper right, determining that the inverse quantization coefficient matrix is flipped left and right; or
    determining a flip mode of the inverse quantization coefficient matrix according to a relationship between the width and height of the inverse quantization coefficient matrix.

8. The video decoding method according to claim 2, wherein performing the rotation processing comprises:
    rotating the inverse quantization coefficient matrix and rearranging at least two coefficients.

9. The video decoding method according to claim 1, wherein determining whether to skip inverse transform processing and whether to inversely rearrange the inverse quantization coefficient matrix comprises:
    in response to the value of the explicit index identifier contained in the coding block being a first value and the implicitly derived index value being the first value, determining to skip the inverse transform processing of the coding block and to inversely rearrange the inverse quantization coefficient matrix corresponding to the coding block;
    in response to the value of the explicit index identifier contained in the coding block being the first value and the implicitly derived index value being a second value, determining to skip the inverse transform processing of the coding block and not to inversely rearrange the inverse quantization coefficient matrix corresponding to the coding block; and
    in response to the value of the explicit index identifier contained in the coding block being the second value, determining to inversely transform, for the coding block, the obtained inverse quantization coefficient matrix.

10. A video decoding apparatus, the apparatus being deployed on a computing device, the apparatus comprising: a memory storing computer program instructions; and a processor coupled to the memory and configured to execute the computer program instructions and perform:

performing entropy decoding on a coding block of a video image frame to obtain a quantization coefficient block of residual data corresponding to the coding block;

inversely quantizing the quantization coefficient block to obtain an inverse quantization coefficient matrix;

counting quantization coefficients in the quantization coefficient block to obtain an implicitly derived index value;

determining whether to skip inverse transform processing of the coding block and whether to inversely rearrange the inverse quantization coefficient matrix according to the implicitly derived index value and a value of an explicit index identifier contained in the coding block;

in response to determining that the inverse quantization coefficient matrix is to be inversely rearranged, inversely rearranging the inverse quantization coefficient matrix to obtain a processed coefficient matrix, non-zero coefficients in the processed coefficient matrix being concentrated in left, upper and upper left regions of the coefficient matrix; and generating the residual data according to the processed coefficient matrix.

11. The video decoding apparatus according to claim 10, wherein inversely rearranging the inverse quantization coefficient matrix includes:

rotating the inverse quantization coefficient matrix, or performing rotation processing and partial coefficient rearrangement on the inverse quantization coefficient matrix.

12. The video decoding apparatus according to claim 11, wherein rotating the inverse quantization coefficient matrix includes one or both of:

rotating all regions or partial regions of the inverse quantization coefficient matrix; and flipping all regions or partial regions of the inverse quantization coefficient matrix.

13. The video decoding apparatus according to claim 12, wherein rotating all regions or partial regions of the inverse quantization coefficient matrix includes:

rotating all regions or partial regions of the inverse quantization coefficient matrix by n×90° in a given direction, wherein n is a non-negative integer.

14. The video decoding apparatus according to claim 12, wherein flipping all regions or partial regions of the inverse quantization coefficient matrix includes one or more of:

flipping all regions or partial regions of the inverse quantization coefficient matrix along a main diagonal;

flipping all regions or partial regions of the inverse quantization coefficient matrix along a counter-diagonal;

flipping all regions or partial regions of the inverse quantization coefficient matrix left and right; and flipping all regions or partial regions of the inverse quantization coefficient matrix up and down.

15. The video decoding apparatus according to claim 12, wherein flipping all regions or partial regions of the inverse quantization coefficient matrix comprises:

determining a flip mode of the inverse quantization coefficient matrix according to an intra-frame prediction pattern adopted by the coding block; and flipping all regions or partial regions of the inverse quantization coefficient matrix based on the flip mode.

16. The video decoding apparatus according to claim 15, wherein determining the flip mode comprises:

in response to the intra-frame prediction pattern of the coding block directing towards the lower left, determining that the inverse quantization coefficient matrix is flipped up and down;

in response to the intra-frame prediction pattern of the coding block directing towards the upper right, determining that the inverse quantization coefficient matrix is flipped left and right; or determining a flip mode of the inverse quantization coefficient matrix according to a relationship between the width and height of the inverse quantization coefficient matrix.

17. The video decoding apparatus according to claim 11, wherein performing the rotation processing comprises:

rotating the inverse quantization coefficient matrix and rearranging at least two coefficients.

18. The video decoding apparatus according to claim 10, wherein determining whether to skip inverse transform processing and whether to inversely rearrange the inverse quantization coefficient matrix comprises:

in response to the value of the explicit index identifier contained in the coding block being a first value and the implicitly derived index value being the first value, determining to skip the inverse transform processing of the coding block and to inversely rearrange the inverse quantization coefficient matrix corresponding to the coding block;

in response to the value of the explicit index identifier contained in the coding block being the first value and the implicitly derived index value being a second value, determining to skip the inverse transform processing of the coding block and not to inversely rearrange the inverse quantization coefficient matrix corresponding to the coding block; and in response to the value of the explicit index identifier contained in the coding block being the second value, determining to inversely transform, for the coding block, the obtained inverse quantization coefficient matrix.

19. A non-transitory computer-readable medium, configured to store a computer program, the computer program, when executed by at least one processor, causing the at least one processor to implement:

performing entropy decoding on a coding block of a video image frame to obtain a quantization coefficient block of residual data corresponding to the coding block;

inversely quantizing the quantization coefficient block to obtain an inverse quantization coefficient matrix;

counting quantization coefficients in the quantization coefficient block to obtain an implicitly derived index value;

determining whether to skip inverse transform processing of the coding block and whether to inversely rearrange the inverse quantization coefficient matrix according to the implicitly derived index value and a value of an explicit index identifier contained in the coding block;

in response to determining that the inverse quantization coefficient matrix is to be inversely rearranged, inversely rearranging the inverse quantization coefficient matrix to obtain a processed coefficient matrix, non-zero coefficients in the processed coefficient matrix being concentrated in left, upper and upper left regions of the coefficient matrix; and generating the residual data according to the processed coefficient matrix.

* * * * *